Dec. 22, 1953   B. T. HENSGEN ET AL   2,663,247
HAM PUMPING
Filed Sept. 6, 1952   7 Sheets-Sheet 1

FIG. 1

BERNARD T. HENSGEN
&
HOWARD G. REICHEL
INVENTORS

BY R. G. Story

ATTORNEY

Dec. 22, 1953     B. T. HENSGEN ET AL     2,663,247
HAM PUMPING Filed Sept. 6, 1952                                                  7 Sheets-Sheet 2

FIG. 2

BERNARD T. HENSGEN
&
HOWARD G. REICHEL
*INVENTORS*

BY R. L. Story

ATTORNEY

Dec. 22, 1953  B. T. HENSGEN ET AL  2,663,247
HAM PUMPING

Filed Sept. 6, 1952  7 Sheets-Sheet 3

FIG. 3

BERNARD T. HENSGEN
&
HOWARD G. REICHEL
INVENTORS

BY R. G. Story

ATTORNEY

Dec. 22, 1953   B. T. HENSGEN ET AL   2,663,247
HAM PUMPING

Filed Sept. 6, 1952

BERNARD T. HENSGEN
&
HOWARD G. REICHEL
INVENTORS

BY R. L. Story

ATTORNEY

Dec. 22, 1953  B. T. HENSGEN ET AL  2,663,247
HAM PUMPING

Filed Sept. 6, 1952  7 Sheets-Sheet 5

FIG. 5

BERNARD T. HENSGEN
&
HOWARD G. REICHEL
INVENTORS

BY R. L. Story

ATTORNEY

Dec. 22, 1953                    B. T. HENSGEN ET AL                    2,663,247
                                      HAM PUMPING
Filed Sept. 6, 1952                                              7 Sheets-Sheet 6

BERNARD T. HENSGEN
&
HOWARD G. REICHEL
*INVENTORS*

BY R. L. Story

ATTORNEY

Dec. 22, 1953     B. T. HENSGEN ET AL     2,663,247
HAM PUMPING

Filed Sept. 6, 1952     7 Sheets-Sheet 7

BERNARD T. HENSGEN
&
HOWARD G. REICHEL
*INVENTORS*

BY  R. L. Story

ATTORNEY

Patented Dec. 22, 1953

2,663,247

UNITED STATES PATENT OFFICE 2,663,247

HAM PUMPING

Bernard T. Hensgen and Howard G. Reichel, Chicago, Ill., assignors to Swift & Company, Chicago, Ill., a corporation of Illinois Application September 6, 1952, Serial No. 308,272

12 Claims. (Cl. 99—256)

The present invention relates to an apparatus for controlling power actuated apparatus in response to the weight indications of a scale.

Those skilled in the art will appreciate from the following description the numerous and varied uses which the present invention has in the field of weighing. One application of the invention is in the field of curing meat products, such as hams, where a curing liquid is pumped into the meat, often through the veins thereof, and an explanation of the application of the invention to that field will illustrate the manner in which the invention may be employed in numerous applications.

For various reasons, such as uniformity of end product, the amount of curing liquid or "pickle" inserted into the ham is, by weight, a predetermined percentage or function of the weight of the ham before the pickle is added. The present practice is to make the fluid line connections to the ham as by means of vein clamps, needles or the like, and to place the ham upon the scale. The operator reads the weight of the ham from the scale dial and consults a chart which tells him what should be the total weight of the ham after the desired percentage of pickle has been added. He then opens valves in the fluid lines which have been connected to the ham to allow the pickle to be injected into the ham and closes the valves after the weight of the ham reaches the weight which the operator obtained from his study of the chart.

Such a practice has a number of disadvantages, particularly in the human errors that the operators will make from time to time. The operator may err in reading the true weight of the ham, in remembering the indicated weight, in examining the correct portion corresponding to the weight remembered, in reading the desired total weight from the chart, in remembering the desired total weight for the ham plus pickle, or in manually shutting off the pickle flow at the proper time. Small errors are often not of any particular consequence, but larger errors may result in changed flavor of the end product, or in the end product being insufficiently cured to have the required keeping qualities for the conditions under which it will be handled subsequent to the curing operation. Obviously, the weighing, computation and reweighing operations as performed in the manner described are time consuming.

The principal object of the present invention is to provide an apparatus which will perform the above operations automatically and eliminate the human factor involved in the steps of adding a given percentage, by weight, of one product to another.

A principal advantage of the invention is that existing scale apparatus readily may be remodeled to incorporate the invention. This remodeling is primarily the addition of new equipment and requires only minor changes in the original parts of the scale. Thus to employ the invention it is not necessary to start with completely new equipment, and there is no loss due to the obsolescence of existing equipment. In some instances the existing scale case is sufficiently large to accommodate the new apparatus, or at least the portions thereof that of necessity must be in actual physical proximity to the existing scale weight indicator.

A further advantage of the invention is that it is sturdy, and relatively uncomplicated. By reason of these facts the initial cost is moderate and the maintenance is nominal. In addition, expert technicians are not required to do such maintenance work as may be necessary from time to time.

A second object of the invention is to provide an apparatus of the type described which may be made as accurate as needed for any given operation. A principal factor in the attainment of this object is that no additional load is placed upon the operation of the original scale mechanism. This lack of loading or drag upon the original scale means that the scale is just as accurate after installation of the additional apparatus of the invention as it was prior to the time any modifications were made. Furthermore, the factors of simplicity and sturdiness previously mentioned enter into a completed device which will have whatever accuracy may be desired.

In some instances in cutting out a ham the butchers may cut it too short and as a result have two veins at the butt of the ham rather than the usual one, i. e. the one that communicates with the two further in the ham in the usual case. In such an instance, the usual practice is to put given proportions of the total amount of the pickle into each of the two veins; for example, 60% of the total amount of the pickle may be put in the vein of the cushion side of the ham, while 40% of the total amount of the pickle may be put in the vein on the flank side of the ham. If the butchers follow their instructions as to cutting out a ham, such a problem will not occur, but occasionally due to error or otherwise a ham will be introduced into the processing line having such a condition, which condition is referred to as a "split vein." While the apparatus of the present invention automatically inserts the desired percentage of pickle into the ham through a single vein connection, another object of the invention is to provide means for the division of the pickle between the two veins should an occasional "split vein" ham be encountered during the processing operation.

With hams, for example, there may be governmental or other requirements that necessitate the making of a record of the "green" or uncured weight of the ham. Thus, a further object of the invention is to automatically record the initial weight of the ham before any pickle is injected therein.

An additional object of the invention is to provide apparatus which after inserting the amount of pickle determined by the weight of the ham into the ham will then inject a fixed quantity of pickle into the cushion side of the ham in accordance with the practices of some ham processors. Some packers follow the practice of inserting a fixed quantity of pickle, for example 2 oz., into the cushion side of the ham through an injection needle, in addition to the quantity of pickle inserted through the veins, which latter quantity is determined by the initial weight of the ham. Such a second injection operation is automatically performed by the instant invention.

Further objects and advantages will become apparent from the following description taken in conjunction with the drawings in which.

Figure 1:
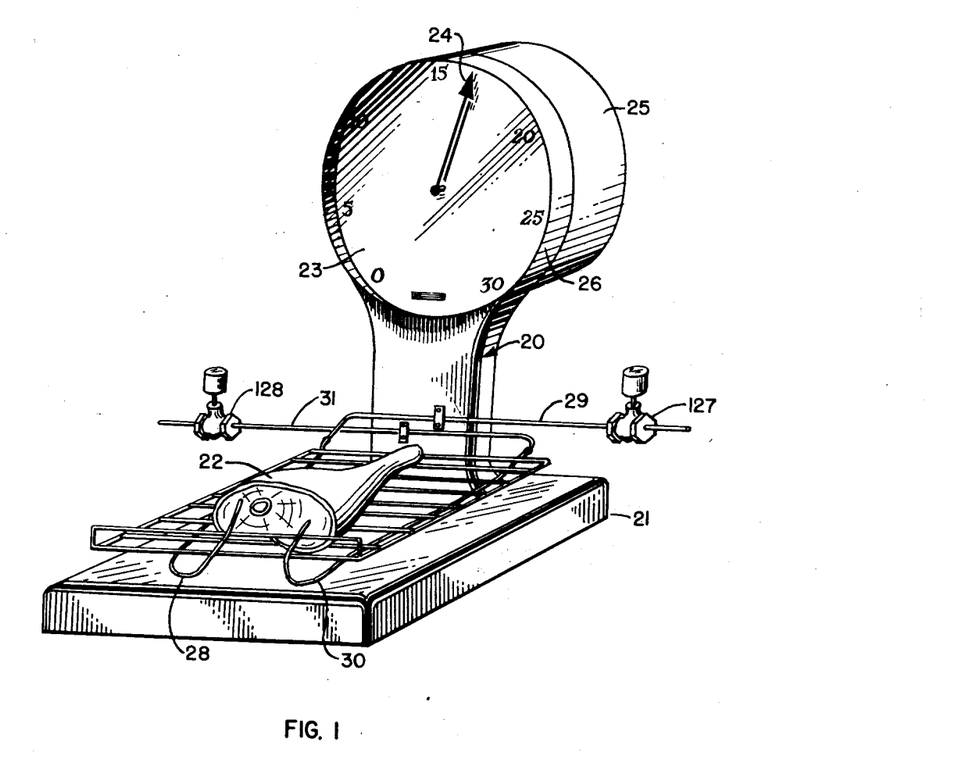
Figure 1 is an isometric view of a scale of the type often used in the pumping of hams, into which scale the instant invention has been incorporated.

The scale generally, 20, illustrated in Figure 1 is more or less typical of a dial scale having a platform 21 upon which the product, in the illustrated case a ham 22, is placed to be weighed. The scale has a dial face 23 upon which the weight is shown by an indicator 24 which rotates along a circular path about the axis of the shaft upon which the indicator is mounted. The mechanism by which the indicator 24 is moved in response to a weight placed upon the weight supporting member, the platform 21 in the illustrated embodiment, is conventional and forms no part of the instant invention. A supplemental case 25 has been added to the rear of the housing 26, which housing carries the dial and indicator. The case 25 covers the additional structure which has been added in accordance with the teachings of the instant invention.

In accordance with the usual practice, a flexible conduit 28 which is fed with pickle from a pipe 29 is connected to the vein of the ham as by means of a vein clamp. An injection needle on the end of a second flexible conduit 30 has been inserted into the cushion side of the ham for the induction of a fixed quantity of pickle, as previously mentioned. The injection needle and conduit 30 are fed with pickle through a pipe 31.

Figure 2:
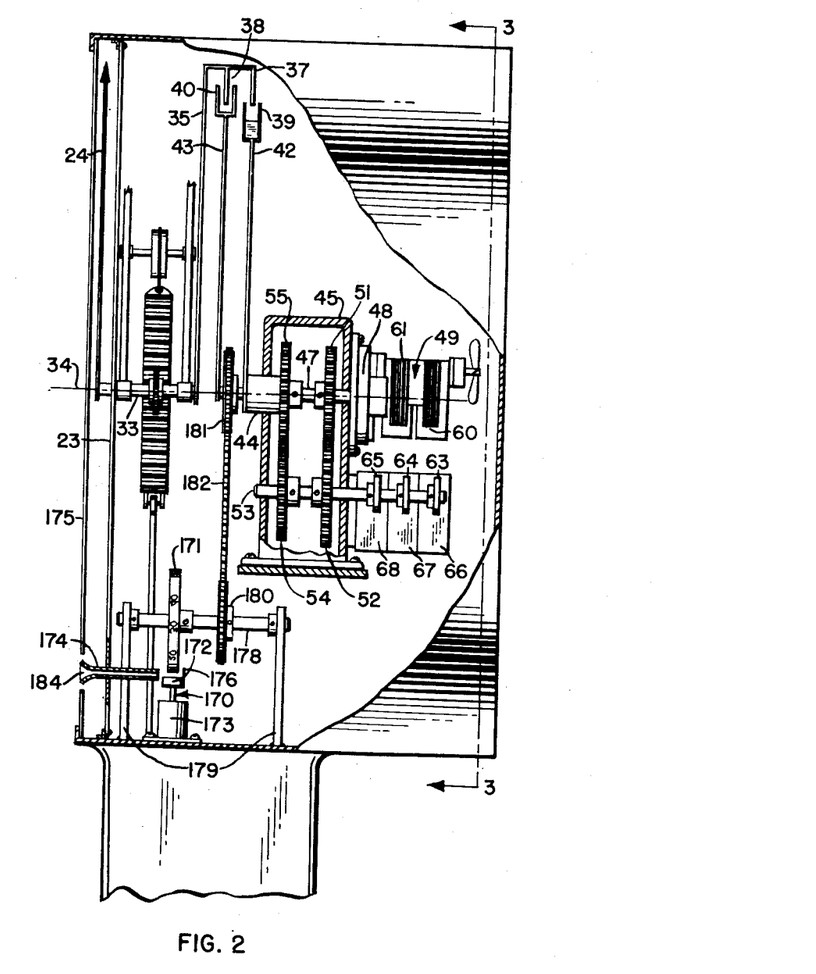
Figure 2 is a sectional elevation of a portion of the scale of Figure 1, illustrating an embodiment of the present invention.

Attached to the shaft 33 which supports and rotates indicator 24 about axis 34 is a weight responsive member in the form of a supplemental arm 35. Because of its connection with shaft 33, arm 35 rotates about axis 34 in response to a weight being placed upon platform 21 to the same extent as does indicator 24, and thus in effect is in itself an indicator, with the angular position of the arm 35 in its path of rotation upon axis 34 being representative of the weight of the platform.

To the rear of indicator arm 35 and projecting downwardly therefrom are a pair of small metal flags 37 and 38 which cooperate with a pair of detector heads 39 and 40, respectively, in the control of the operation of the brine addition and computing mechanism.

Figure 3:
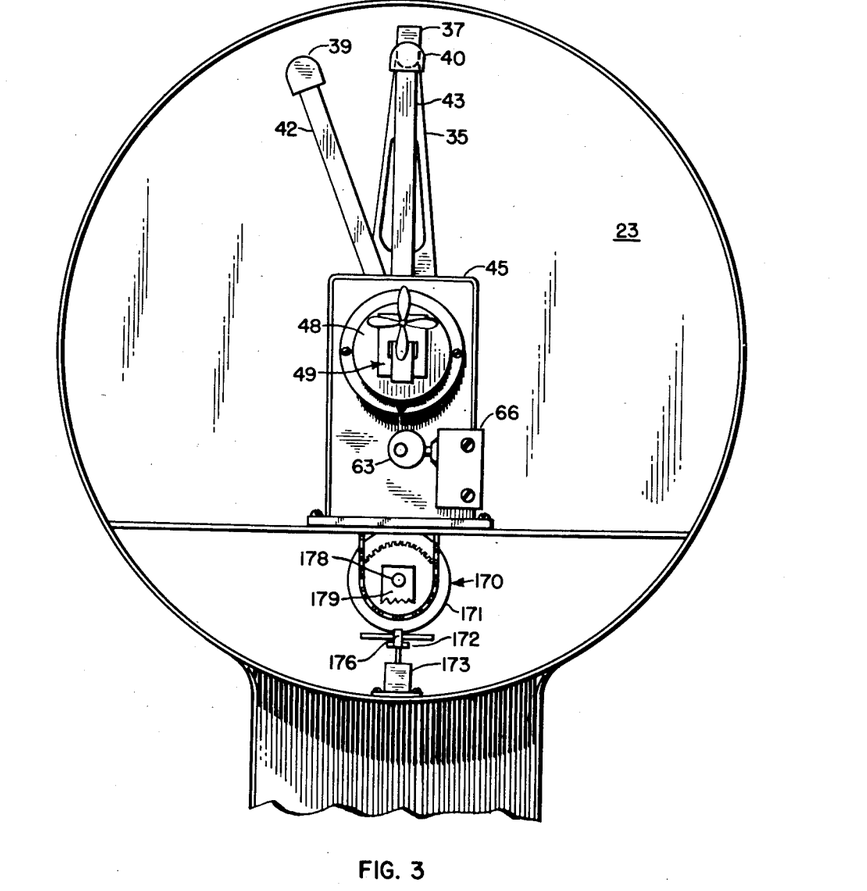
Figure 3 is a view taken at line 3—3 of Figure 2.

The mounting means for the detector heads include a pair of arms 42 and 43, respectively. Arm 42 is secured to a sleeve 44, journaled in frame 45. A shaft 47 is mounted within the central opening of sleeve 44 with arm 43 being attached to the outer end of the shaft. Shaft 47 and sleeve 44 are mounted to rotate independently of each other and are each concentric but independent of shaft 33 so that all three are rotatable about axis 34.

At the inner end, shaft 47 is attached to the output of a speed reduction gear box 48 driven by an electric motor generally 49. A gear 51 attached to shaft 47 drives a second gear 52 attached to an idler shaft 53 journaled in frame 45. A third gear 54 is attached to shaft 53 to mesh with and drive a gear 55 secured to the inner end of sleeve 44.

It will be apparent that in the paths of rotation about axis 34 every angular position of indicator 35 will be representative of a particular weight on platform 21, which weight is shown on dial face 23 by indicator 24. Similarly the angular positions of arms 42 and 43 about axis 34 will correspond to angular positions of indicator 34 about the axis, and will be representative of specific weights on the platform. The size of the gears is such that at all times arms 42 and 43 will be at angular positions in their respective paths of rotation, corresponding to two weights upon scale platform 21, one of which weights is a given percentage greater than, or function of, the other of the weights. For example, if it is desired that the quantity of pickle added to the meat is 10% of the weight of the meat, the angular position of arm 42 will at all times represent a weight which is 10% greater than the weight represented by the angular position of arm 43. If gear 51 is a 66-tooth gear, gear 52 is a 60-tooth gear, gear 54 a 63-tooth gear, and gear 55 a 63-tooth gear, a 10% differential will be obtained between the positions of arms 42 and 43. The position of both arms should coincide at the zero weight point on their paths of rotation.

Motor 49 is a dual field motor driving a common shaft. One field 60 turns the motor armature in one direction while the second field 61 turns the motor armature in the other direction. As will hereinafter be described in the illustrated embodiment, the rest position of the two arms 42 and 43 is adjacent the portions of their paths corresponding to the maximum weight on the scale platform, and as the device is operated the two arms move toward the portions of their path corresponding to the minimum weight on the scale platform. For the purposes of convenience and description, this movement of the two arms 42 and 43 toward the minimum weight end of their paths of movement will be referred to as a forward movement, while the movement in the opposite direction, i. e. toward the maximum weight portions of the two paths will be referred to as the reverse movement. Similarly, we will refer to field 60 as the forward field, i. e. the field that when energized will cause the two arms 42 and 43 to move in a forward direction, and field 61 will be referred to as the reverse field, i. e. the one that when energized will cause the two arms 42 and 43 to move in the reverse direction.

A rearward extension of shaft 59 has three cams 63, 64 and 65 attached to it, which cams actuate three snap-acting switches 66, 67 and 68 respectively.

The two detectors generally 70 and 71 are identical and include the detector heads 39 and 40, respectively, previously mentioned. A description of detector 70 illustrated in Figure 5 will suffice to explain the operation of each of the detectors. Because of space and mounting conditions, the detector head 39 is physically separated from the remainder of the detector structure, but as will be apparent from the description, it is in effect a single unit and given the necessary space requirements could be carried on the mounting means therefor as a unit.

Figure 5:
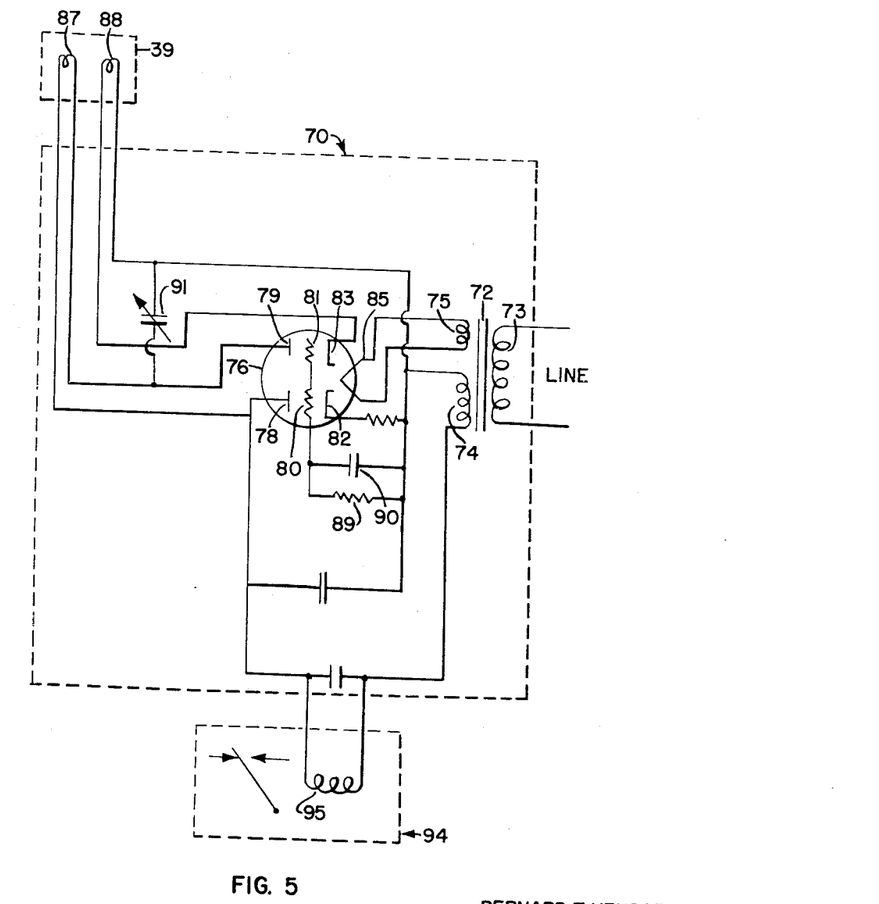
Figure 5 is a schematic diagram of the detectors utilized in the described embodiment of the invention.

A power transformer 72, the primary 73 of which is connected to a suitable source of electricity, provides the power through a pair of secondary windings 74 and 75 for the operation of a dual triode tube 76. Tube 76 has a pair of plates 78 and 79, a pair of corresponding grids 80 and 81, respectively, and a pair of corresponding cathodes 82 and 83, respectively. A heater 85 is connected to secondary coil 70.

The first triode, comprising elements 78, 81 and 83, functions as an oscillator with the output from plate 78 energizing coil 87 and being fed back to cathode 83 through coil 86. The output of the first triode is supplemented by the output of the other triode to provide a positive action to the output relay. The two valves work together because of the common grid connection. Timing is obtained through the interconnection of resistor 89 and condenser 90 with the grids 80 and 81 while variable condenser 91 acts as a sensitivity control. Coils 87 and 88 are mounted on arm 42 so as to pass to either side of flag 37 on indicator 36. When the flag passes between the coils, there is a significant change in the plate current of the two triodes to actuate the output relays.

Detector 70 includes a single pole, double throw relay generally 94 having an actuating coil 95. Similarly, detector 71 includes a single pole, double throw relay generally 96 having actuating coil 97 (see Figure 4).

The Brown Instruments Division of Minneapolis Honeywell Regulator Company produce a device which is referred to as an Electr-O-Vane Controller, type 353848-2, which may be utilized by reconstructing to separate the detector head 39 from the remainder of the unit. A very similar detector is described on page 52 of Handbook of Industrial and Electronic Circuits by Markus and Zeluff, 1948, McGraw-Hill Book Company, the disclosure of which is included herein by reference.

Figure 4:
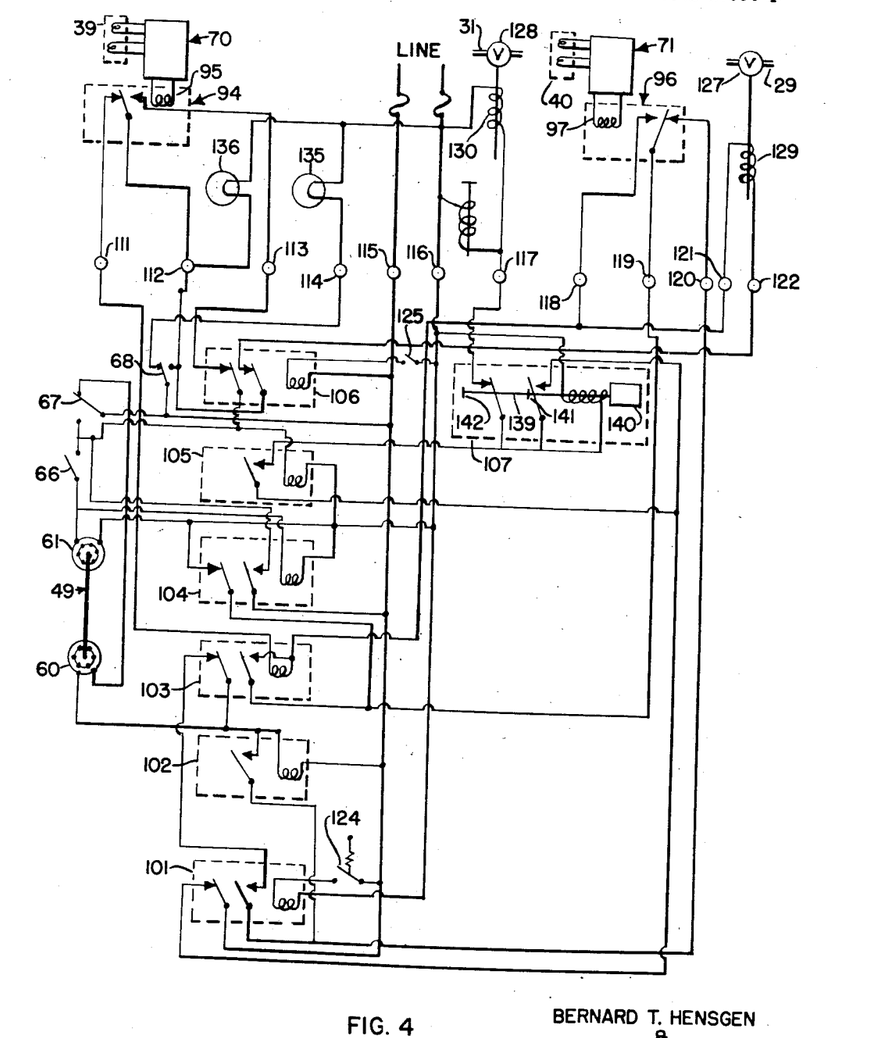
Figure 4 is the wiring diagram of the electrical control apparatus of the invention.

Referring now to Figure 4, a series of seven relays 101 through 107, respectively, are employed. The majority of the external connections are made to a series of 12 binding posts 111 through 122, respectively. In addition to the three cam-operated snap-acting switches 66, 67 and 68, previously mentioned, a momentary contact starting switch 124 and a switch 125 for split vein operation are employed.

Referring briefly to Figure 1, it will be seen that a solenoid-operated valve 127 is employed in line 29 to control the flow of the pickle to the vein conduit 28. A second solenoid-operated valve 128 is similarly utilized in line 31 to control the fixed amount of pickle injected into the cushion side of the ham through conduit 30. The valves 127 and 128 are spring loaded so that they will normally be closed and will be only open when solenoids 129 and 130, respectively, are energized.

At the start of a cycle the position of the contacts of the various components is as shown in Figure 4, except that the coil of relay 107 has remained energized from the end of the preceding cycle, as will hereinafter be described. Binding posts 115 and 116 are connected to a suitable source of electrical supply.

Figure 6:
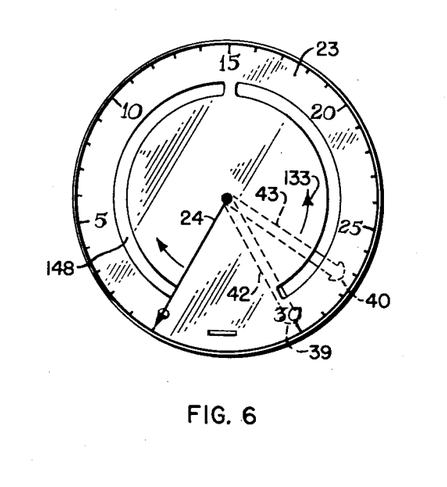
Figures 6, 7 and 8 are diagrammatic views of the face of the scale of Figure 1, utilized in describing the operation of the disclosed embodiment.
Figure 7:
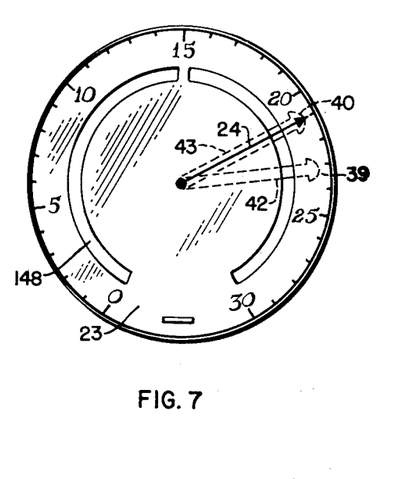

The position of the indicator 24 is at the low end of the scale dial as illustrated in Figure 6 and indicator arm 35 is likewise at the low weight end of its path of travel. The two arms 42 and 43 are at the high weight end of their paths of travel. The weight of the ham on the scale rotates indicator 24 around the dial 23 to a point corresponding to the weight of the ham (the weight of the conduits 29 and 30, together with the contents thereof, having been previously zeroed out as is the usual practice). The indicator 24 comes to rest at the point indicating the weight of the ham, which position of indicator 24 is illustrated in Figure 7.

After the ham 22 with the two pickle conduits 29 and 30 attached thereto is placed on the scale platform, the cycle is started by the operator momentarily closing starting switch 124 to energize the coil of relay 101. The opening of the normally closed contacts of relay 101 by the energizing of the coil breaks the circuit through the coil of relay 107 to allow that relay to reset into the position illustrated in Figure 4.

The closing of the normally opened contacts of relay 101 creates a circuit from binding post 115 through the right-hand contact of the overrun stop switch 67, the motor forward field 60, the normally closed contacts of relay 103, the normally opened contacts of relay 101, the normally closed contacts of relay 96 of detector 71, the normally closed contacts of relay 104 to binding post 116. The energizing of motor forward field 60 starts arms 42 and 43 moving in a forward direction as indicated by arrow 133 in Figure 6.

The closing of the normally opened contacts of relay 101 energizes the coil of relay 102 through a circuit commencing with binding post 115, the coil of relay 102, the normally closed contacts of relay 103, the normally opened contacts of relay 101, the normally closed contacts of relay 96, the normally closed contacts of relay 104 to binding post 116. The energizing of the coil of relay 102 closes the contacts thereof to short out a portion of the circuit of forward motor field 60 and the coil of relay 102, which portion comprises the normally closed contacts of relay 103 and the normally opened contacts of relay 101 so that the release of the starting switch 124 and the relaxation of relay 101 will not deenergize either the motor field 60 nor the coil of relay 102.

The initial movement of the motor in turning arms 42 and 43 in the forward direction also turns the cams on shaft 53. The movement of cams 63 and 65 actuates switches 66 and 68 to the opposite positions from those shown in Figure 4, i. e. switch 66 closes and switch 68 moves from the top contact to the lower contact. The green light 135 which had been energized by the original position of the light switch 68 is turned out by the movement of the switch and the red light 136 is turned on by the movement of switch 68 to the lower contact thereof.

Should a failure occur and detector 71 not stop the motor 49 when detector head 40 reaches indicator 35, as is hereinafter described, so that the two arms 42 and 43 continue their movement toward the low weight end of their path of travel, switch 67 would be actuated by cam 64 as the two arms approach the low weight end of their path of travel to open the circuit through the motor forward field 60 to prevent an overdrive which might break some of the mechanism.

When detector head 40 reaches indicator 35 (the position illustrated in Figure 7), flag 38 passes between the two coils of the detector head to actuate the detector relay 96. The breaking of the normally closed contacts of relay 96 opens the circuit through both the coil of relay 102 and the motor forward armature 60 to stop the motor and deenergize relay 102. At the same time the normally opened contacts of relay 96 of the detector 71 are closed to complete a circuit from binding post 115 through the lower contact of light switch 68, the normally closed contacts of relay 94 of detector 70, the coil of relay 103, the normally opened contacts of relay 96, the normally closed contacts of relay 104 to binding post 116.

The energizing of the coil of relay 103 energizes solenoid 129, energized by a circuit from binding post 115 through the lower contacts of the light switch 68, the lower normally closed contacts of relay 106, solenoid 129, the normally opened contacts of relay 103, the normally closed contacts of relay 104 to binding post 116. Closing the normally opened contacts of the coil of relay 103 also creates a holding circuit through that coil from binding post 115 through the light switch, the normally closed contacts of relay 95, the coil of relay 103, the normally opened contacts of relay 103, the normally closed contacts of relay 104 to binding post 116.

The energizing of relay 103 also opens the normally closed contacts of that relay, which contacts are in the starting circuit, as previously described, through the normally opened contacts of relay 101, so that the pressing of the starter button 124 will not produce any malfunction of the apparatus.

Figure 8:
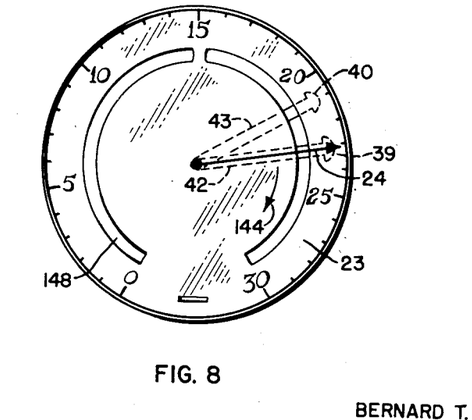

When valve 127 was opened by the energizing of solenoid 129, pickle commenced to flow into the ham through conduit 28. The increase in weight of the ham due to the addition of the pickle thereto commences indicator 24 again moving toward the high weight end of the dial 23. This continues until flag 37 passes between the coils of detector head 39 of detector 70, which position is illustrated in Figure 8. As has previously been described, the passing of the flag between the coils actuates the detector to change the position of relay 94. It will be remembered that the circuits of both solenoid 129 and the coil of relay 103 passed through the normally closed contacts of relay 94 and the breaking of those normally closed contacts allows the pickle valve to close to stop the addition of pickle through conduit 28, and also releases relay 103.

At the same time the normally opened contacts of relay 94 are closed to create a circuit from binding post 116 through the coil of relay 104 and a separate branch through the motor reverse field 61, to the reverse stop switch 66, the upper normally closed contacts of relay 106, the normally opened contacts of relay 94, the lower contacts of light switch 68 to binding post 115. When the normally opened contacts of relay 104 are closed by reason of the energizing of the coil thereof, the portion of the foregoing circuit which included the normally opened contacts of relay 94 and the light switch 68 is short-circuited so as to lock in the relay 104 and maintain the motor reverse field 61 energized.

At the same time that relay 104 and the field 61 were energized, the coil of relay 105 was energized through a circuit from binding post 116, the coil of relay 105, the upper normally closed contacts of relay 106, the normally opened contacts of the relay 94 of detector 70, the lower contact of light switch 68 to binding post 115. Energizing the coil of relay 105 closes the normally opened contacts thereof to complete a circuit through the solenoid 130 of the cushion pickle valve 128 and the coil of relay 107 as follows: from binding post 116 through the solenoid 130, the normally opened contacts of relay 105 and from binding post 116 through the coil of relay 107 to the normally opened contacts of relay 105, from the contacts of relay 105 to the normally closed contacts of relay 101 to binding post 115.

Relay 107 is a combination slow and fast-acting relay. This is achieved by connecting the actuating plunger 139 to a dashpot 140 so that the plunger moves in slowly against the resistance of the dashpot. A crosspiece 141 immediately above the moving arm of the normally opened contacts of relay 107 pulls those contacts closed almost immediately after the energizing of the coil of relay 107. Similarly, the crosspiece 142 that actuates the moving arm of the normally closed contacts of the relay is spaced a substantial distance from that arm so that the normally closed contacts are only opened after a time delay has occurred from the instant of the energizing of the coil of relay 107. The extent of the time delay is regulated by the changing rate at which the dashpot 140 allows the plunger 139 to be pulled in.

The energizing of the coil of relay 107 thus immediately closes the normally opened contacts of that relay to create a holding circuit from binding post 116 through the coil of relay 107, the normally opened contacts of relay 107, the normally closed contacts of relay 101 to binding post 115.

As has previously been mentioned, the closing of relay 105 creates a circuit through solenoid 130 of valve 128 through the normally closed contacts of relay 107. At the end of the time delay period, crosspiece 142 on plunger 139 opens the normally closed contacts to break that circuit and close valve 128.

The pressure applied to the pickle entering pipe 31 is maintained at a constant amount. One method of doing this is to maintain a constant head in an open pickle supply tank. An orifice (not shown) is provided in pipe 31 with the dimensions of the orifice being such that with the constant pressure head the desired quantity of pickle will pass through the orifice and thence through conduit 30 into the cushion side of the ham in the length of time between the energizing of the coil of relay 107 and the time when the normally closed contacts of that relay are opened.

When the coil of relay 104 was energized as previously mentioned, the normally closed contacts thereof are opened to prevent the energizing of the coil of relay 101 by an actuation of starting switch 124 from producing a circuit through either relay 102 or the motor forward field 60.

During the period of time in which additional pickle was being added to the ham by reason of valve 128 being open, the reverse field 61 was energized to cause the two arms 42 and 43 to be moved back toward their initial position, the direction of movement being indicated by arrow 144 in Figure 8. When the two arms reach their initial position, cam 63 opens switch 66 to stop the motor 49, and to deenergize the coil of relay 104. At the same time, cam 65 actuates switch 68 to turn off the red light 139 and to relight the green light 135.

Since relay 107 was locked in, it remains energized until the starting switch 124 is again closed to open the normally closed contacts of that relay and break the circuit through the coil of relay 107.

In the few cases where the ham will have a split vein, the flexible conduit 28 is initially connected to the vein on the cushion side of the ham. After the ham is placed on the scale, the starting button 124 is pressed and the cycle is allowed to start in the customary way. Meanwhile, the operator notes the weight of the ham as indicated by the position of indicator 24 and by consulting his chart notes what the weight of the ham should be after a given percentage, say 60% of the total amount of the pickle, is added to the ham. After the device has commenced adding the pickle to the ham, the operator watches for the indicator 24 to turn to the weight which he obtained from the chart as being the weight of the ham plus 60% of the pickle.

When the indicator reaches that weight, the operator closes switch 146 to energize the coil of relay 106 and open the normally closed contacts thereof. The opening of these contacts breaks the circuit through the solenoid 129 of the pickle valve and stops the flow of pickle.

At the same time the circuit is opened through the normally opened contacts of relay 94 of detector 70 so that should the scale be disturbed during the changing of the vein connection, the actuation of the relay 94 will not cause the reversing field 61 to be energized and return the apparatus to the starting position. While switch 146 remains closed, the operator removes the vein clamp from the vein on the cushion side and transfers it to the vein on the flank side of the ham. Switch 146 is then opened closing the contacts of relay 106 to restore the circuits for the completion of the remainder of the original cycle.

If the device is constructed so that the operator can see through dial face 23, either by means of apertures 148 or transparent windows, etc., so that the operator can note the position of indicator 24 with respect to arms 42 and 43, it will be possible for the operator to estimate when indicator 24 has moved 60% (or such other proportion as may be desired for the amount of the total pickle to be placed in the cushion vein) of the distance between the two arms. After some experience, the operator may become quite proficient in estimating this amount of movement with considerable accuracy. This will avoid the necessity of the operator consulting a chart and will speed up the operation.

Figure 9:
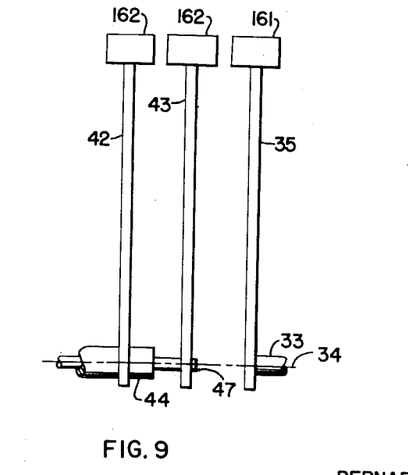
Figures 9 and 10 are diagrammatic illustrations of an alternative form of a detector.
Figure 10:
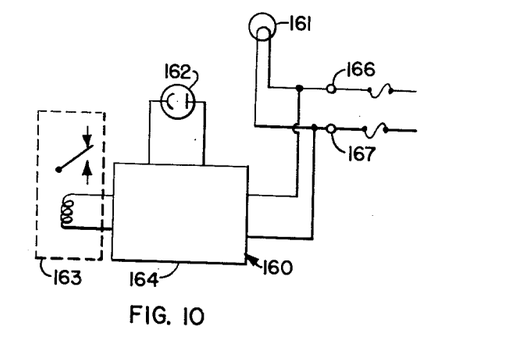

Figures 9 and 10 illustrate an alternative form of a detector. In this structure the detector generally 160 cooperates with a light 161 to signal the correct positioning of the arms 42 or 43 with respect to indicator 35. Detector 160 includes a photoelectric cell 162, a relay 163 and an amplifier 164 connected to actuate relay 163 in response to a strong beam of light falling upon cell 162. Relay 163 will replace relay 94 of detector 70 or relay 96 of detector 71.

Light 161 and amplifier 164 are connected to a suitable source of electric power at binding posts 166 and 167. Light 161 is mounted on indicator 35, while cell 162 of detector 160 is mounted on arm 43 (or 42 as the case may be) facing light 161. As is known to those skilled in the art, suitable masks (not shown) across the front of light 161, cell 162, or both, may be employed to narrow the field in which actuation of relay 163 will occur. Thus, when light 161 reaches the cell of the detector, relay 163 will be actuated to stop the movement of the detectors or to stop the flow of pickle as the case may be.

In instances where it is desired to automatically record the "green" weight of the ham, the device is provided with a weight recording apparatus, generally 170, including a printing wheel 171 having suitable indicia thereon. Cooperating with wheel 171 is a printing platen 172, mounted on the armature of a solenoid 173. A guide 174 extends through the glass 175 covering the face of the scale and through the scale dial 23, to provide an opening through which a record card may be inserted to have the weight of the ham stamped thereon. A stop 176 on the back of platen 172 positions the record card between wheel 171 and platen 172.

Wheel 171 is secured to shaft 178, journaled in a pair of support brackets 179. Also attached to shaft 178 is a pinion 180 which is connected to a like pinion 181 by means of a chain 182. Pinion 181 is attached to shaft 47 so that the rotation of the wheel 171 duplicates the rotation of arm 43. The indicia on wheel 171 at the point opposite platen 172 at any given instant corresponds to the weight represented by the position of arm 43 in its path of travel. As will be seen from Figure 4, solenoid 173 is connected in parallel with solenoid 129 of valve 127.

Before the cycle of operation previously discussed is initiated, the card upon which the weight is to be recorded is inserted through opening 184 by the operator. The card is pushed all the way back against stop 176 so that it lies between wheel 171 and platen 172.

At the instant detector head 40 reaches indicator arm 35, and the motor is stopped as previously described, the portion of wheel 171 directly opposite platen 172 indicates the weight of the ham on the scale before any addition has been made thereto. As has previously been described, the solenoid 129 is then energized to commence adding pickle to the ham. However, at the same instant that solenoid 129 is energized, solenoid 173 will also be energized, driving platen 172 towards wheel 171 to imprint on the card the weight shown by the indicia on the portion of the wheel opposite the platen.

The foregoing description is for the purpose of complying with the requirements of 35 U. S. C. 112, and should not be construed as imposing unnecessary limitations upon the appended claims. From the foregoing descriptions, various modifications will be apparent to those skilled in the art; as for example, in place of the detectors which have been described herein, one might employ a capacitance control circuit, such as one of those described on page 22, et seq., of the publication Handbook of Industrial Electronic Circuits by Markus and Zeluff, published in 1948 by McGraw-Hill Book Company, the disclosure of which is included herein by reference. Also, as previously mentioned, the invention has numerous other applications outside the particular field in which it has been described; as for example, it might be used in the addition of one chemical to another during the course of a chemical manufacturing process in which the product to be added is by weight a function of the weight of the initial chemical upon the scale.

It will be apparent that the invention may be used for subtraction as well as for addition. For example, a certain amount by weight of a fluid in a suitable container might be withdrawn from the container. In such a case, it would be desirable to have the movement of the two arms 42 and 43 be in the same direction as the initial movement of the indicator 24 starting from the low weight end of their paths of movement. When the arm carrying detector 71 reaches the indicator arm 35, a pump inserted in place of solenoid 129 would be energized to start withdrawing the fluid from the container, or if the fluid were in the container under pressure, a valve such as 127 would release the fluid from the container. As the fluid was withdrawn, the vane 24 would back down the scale and upon reaching detector 73, which would be positioned behind detector 71 by the desired amount, the circuit through binding posts 121 and 122 would be opened so as to stop the motor or close the valve as the case might be. The amount of differential between arms 42 and 43 would be governed by the size of the gear interconnecting the shafts upon which the two arms are attached, as previously described.

While the weight recording portion of the invention has been described in conjunction with the portions of the invention involving the addition or subtraction of material from the scale, it will be clear that in some embodiments it might be used alone.

To the extent that they are covered by the following claims, all such obvious modifications are believed to be within the scope of our invention.

We claim:

1. An apparatus for adding an amount of one substance to a second substance wherein the amount to be added is a percentage of the weight of the second substance, said apparatus including a scale having a weight supporting member and a weight responsive member movable along a given path in a given direction in response to the addition of weight to said weight supporting member an amount which is a function of the weight placed upon said weight supporting member, supply means for said one substance, including substance transfer means to add the one substance to the second substance and regulating means to control the amount of said one substance added by said transfer means to said second substance, a pair of detectors, mounting means for said detectors to permit said detectors to be moved along said path, power drive means connected to said detector mounting means to move said detectors along said path, and control means connected to one of said detectors and to said power drive means to position the other of said detectors, upon said one of the detectors reaching the point on the path occupied by the weight responsive member and corresponding to the weight of said second substance placed upon said platform, at a second point on said path corresponding to said weight plus said percentage and to incapacitate said driving means, said control means being also connected to said regulating means to start said transfer means adding said one substance to said second substance upon said driving means being incapacitated, said other detector being connected to said control means to stop said transfer means adding said second substance upon said weight responsive member reaching said second point.

2. An apparatus for adding an amount of one substance to a second substance wherein the amount to be added is a percentage of the weight of the second substance, said apparatus including a scale having a weight supporting member and a weight responsive member movable along a given path in a given direction in response to the addition of weight to said weight supporting member an amount which is a function of the weight placed upon said weight supporting member, supply means for said one substance including substance transfer means to add the one substance to the second substance and regulating means to control the amount of said one substance added by said transfer means to said second substance, a pair of detectors, mounting means for said detectors to permit said detectors to be moved along said path, power drive means connected to said detector mounting means to move said detectors along said path in a direction opposite to said given direction, and control means connected to one of said detectors and to said power drive means to position the other of said detectors, upon said one of the detectors reaching the point on the path occupied by the weight responsive member and corresponding to the weight of said second substance placed upon said weight supporting member, at a second point on said path corresponding to said weight plus said percentage and to incapacitate said power drive means to stop said detectors, said control means being also connected to said regulating means to start said transfer means adding said one substance to said second substance upon said driving means being incapacitated, said other detector being connected to said control means to stop said transfer means adding said second substance upon said weight responsive member reaching said second point.

3. An apparatus for adding an amount of one substance to a second substance wherein the amount to be added is a percentage of the weight of the second substance, said apparatus including a scale having a weight supporting member and a weight responsive rotatable member movable about an axis along a given path in a given direction in response to the addition of weight to said weight supporting member an amount which is a function of the weight placed upon said weight supporting member, supply means for said one substance including substance transfer means to add the one substance to the second substance and regulating means to control the amount of said one substance added by said transfer means to said second substance, a pair of detectors, mounting means for said detectors to permit said detectors to be moved along said path about said axis, power drive means including a motor connected to each of said detector mounting means through a gear train to move said detectors about said axis with the two detectors spaced from each other an amount representing said percentage of the weight corresponding to the point on the path occupied, at any given instant, by one of said detectors, and control means connected to said one of said detectors and to said drive means to stop said detectors upon said one of said detectors reaching the point on the path corresponding to the weight of the substance placed on the scale whereby the other detector is stopped at a second point on said path corresponding to said weight of said substance plus said percentage, said control means being also connected to said regulating means to start said transfer means adding said one substance to said second substance upon said detectors being stopped, said other detector being connected to said control means to stop said transfer means adding said second substance upon said rotatable member reaching said second point.

4. An apparatus for adding an amount of fluid to a meat cut wherein the amount of fluid is a percentage of the weight of the cut, said apparatus including a scale having a scale platform and a weight indicator movable along a given path in a given direction in response to the addition of weight to said platform, fluid injection means including a fluid conduit and a valve to control the flow of fluid through said conduit, a pair of detectors, mounting means for said detectors to permit said detectors to be moved along said path, power driving means connected to said detector mounting means to move said detectors along said path, and control means connected to one of said detectors and to said power drive to position the other of the detectors, upon said one detector reaching the point on the path corresponding to the weight of the cut and occupied by the indicator, at a second point in the path corresponding to said weight plus said percentage and to incapacitate said driving means, said control means being also connected to said valve to open said valve upon said driving means being incapacitated, said other detector being connected to said control means to close said valve upon said indicator reaching said second point.

5. An apparatus for adding an amount of fluid to a meat cut wherein the amount of fluid is a percentage of the weight of the cut, said apparatus including a scale having a scale platform and a weight indicator rotatable along a given path in a given direction about an axis in response to the addition of weight to said platform, fluid injection means including a fluid conduit and a valve to control the flow of fluid through said conduit, a pair of detectors, mounting means for said detectors to permit said detectors to be moved along said path about said axis, power driving means including a motor connected to each of said detector mounting means through a gear train to move said detectors about said axis with the two detectors spaced from each other an amount representing said percentage of the weight corresponding to the point on the path occupied, at any given instant, by one of said detectors, and control means connected to said one of said detectors and to said drive means to stop said detectors upon said one of said detectors reaching the point on the path corresponding to the weight of the substance placed on the scale whereby the other detector is stopped at a second point on said path corresponding to said weight of said substance plus said percentage, said control means being also connected to said valve to open said valve upon said detectors being stopped, said other detector being connected to said control means to close said valve upon said indicator reaching said second point.

6. An apparatus for use with a scale of the type having a weight responsive member movable along a given path in response to the weight imposed upon the weight supporting member thereof an amount which is a function of the weight imposed on said supporting member and with automatic means to change the weight of said object, said apparatus including a pair of detectors, mounting means for said detectors to permit said detectors to be moved along said path, power drive means connected to said detector mounting means to move said detectors along said path, and control means connected to one of said detectors and to said power drive to position the other of said detectors, upon said one of the detectors reaching the point on the path occupied by the weight responsive member and corresponding to the weight of the object on said weight responsive member, at a second point on said path corresponding to said weight changed by said amount and to incapacitate said driving means, said control means being adapted to be connected to said automatic means to initiate the changing in weight of the object by said automatic means upon the driving means being incapacitated, said other detector being connected to said control means to stop said automatic means from changing the weight of the object upon said weight responsive member reaching said second point.

7. An apparatus for use in the processing of a meat cut with a scale of the type having a weight supporting platform and a weight responsive member rotatable along a given path in a given direction about an axis in response to the addition of weight on said platform, and fluid injection means including a valve to control the flow of the fluid applied in the processing of a meat cut, said apparatus including a pair of detectors, mounting means for said detectors to permit said detectors to be moved along said path, power drive means including a motor connected to said detector mounting means through a gear train to rotate said detectors about said axis at different speeds of revolution, said difference in speeds of revolution being such that the position of one of said detectors on said path will always be at a point corresponding to a weight on said platform equal to the weight on the platform corresponding to the point on the path at which the other detector is positioned plus a given percentage of said last mentioned weight, and control means adapted to be connected to said valve, said control means being connected to said drive means and to the other of the detectors to stop the two detectors upon said other detector reaching the point on the path occupied by the weight responsive member and to open said valve to commence the addition of fluid to the meat cut, said one detector being connected to said control means to close said valve when said weight responsive member reaches the point on the scale occupied by said one detector.

8. An apparatus for use in the processing of a meat cut with a scale of the type having a weight supporting platform and a weight responsive member rotatable along a given path in a given direction from a minimum weight indication toward a maximum weight indication in response to the addition of weight on said platform and fluid injection means including a valve to control the flow of the fluid applied in the processing of a meat cut, said apparatus including a pair of detectors, mounting means for said detectors to permit said detectors to be moved along said path, power drive means including a motor connected to said detector mounting means through a gear train to rotate said detectors at different speeds of revolution, said difference in speeds of revolution being such that the position of one of said detectors on said path will always be at a point corresponding to a weight on said platform equal to the weight on the platform corresponding to the point on the path at which the other detector is positioned plus a given percentage of said last mentioned weight, and control means adapted to be connected to said valve, said control means being connected to said drive means to normally position said detectors in the portion of the path adjacent said maximum weight indication, said control means having a starting means to actuate said drive means to move said detectors along said path in the reverse of said given direction, with said one of the detectors moving more slowly than the other of the detectors, said control means being connected to the other of the detectors to stop the two detectors upon said other detector reaching the point on the path occupied by the weight responsive member and to open said valve to commence the addition of fluid to the meat cut, said one detector being connected to said control means to close said valve when said weight responsive member reaches the point on the scale occupied by said one detector and to return said detectors to said portion of the path adjacent said maximum weight indication.

9. An apparatus for use in the processing of a meat cut with a scale of the type having a weight supporting platform and a weight responsive member rotatable along a given path in a given direction from a minimum weight indication toward a maximum weight indication in response to the addition of weight on said platform and fluid injection means including a valve to control the flow of the fluid applied in the processing of a meat cut, said apparatus including a pair of detectors, mounting means for said detectors to permit said detectors to be moved along said path, power drive means including a motor connected to said detector mounting means through a gear train to rotate said detectors at different speeds of revolution, said difference in speeds of revolution being such that the position of one of said detectors on said path will always be at a point corresponding to a weight on said platform equal to the weight on the platform corresponding to the point on the path at which the other detector is positioned plus a given percentage of said last mentioned weight, and control means adapted to be connected to said valve, said control means being connected to said drive means to normally position said detectors in the portion of the path adjacent said maximum weight indication, said control means having a starting means to actuate said drive means to move said detectors along said path in the reverse of said given direction, with said one of the detectors moving more slowly than the other of the detectors, said control means being connected to the other of the detectors to stop the two detectors upon said other detector reaching the point on the path occupied by the weight responsive member and to open said valve to commence the addition of fluid to the meat cut, said control means including a control member by which said addition of fluid may be manually stopped, said one detector being connected to said control means to close said valve when said weight responsive member reaches the point on the scale occupied by said one detector and to return said detectors to said portion of the path adjacent said maximum weight indication, said control member, when manually operated to stop said flow of fluid, incapacitating said control means to render said control means inoperative to return said detectors to said portion of said path adjacent said maximum weight indication should said weight responsive member reach the point on the scale occupied by said one detector.

10. An apparatus for adding an amount of one substance to a second substance wherein the amount to be added is a percentage of the weight of the second substance, said apparatus including a scale having a weight supporting member and a weight responsive member movable along a given path in a given direction in response to the addition of weight to said weight supporting member an amount which is a function of the weight placed upon said weight supporting member, supply means for said one substance including substance transfer means to add the one substance to the second substance and regulating means to control the amount of said one substance added by said transfer means to said second substance, a pair of detectors, mounting means for said detectors to permit said detectors to be moved along said path, power drive means connected to said detector mounting means to move said detectors along said path in a direction opposite to said given direction, control means connected to one of said detectors and to said power drive to position the other of said detectors, upon said one of the detectors reaching the point on the path occupied by the weight responsive member and corresponding to the weight of the second substance placed upon said weight supporting member, at a second point on said path corresponding to said weight plus said percentage and to incapacitate the power drive means to stop said detectors, and automatically controlled weight recording means connected to said power drive means to record the weight corresponding to the point on the path at which said one detector stops, said control means being connected to said weight recording means to actuate said means to record the weight at the time said detectors are stopped, said control means being also connected to said regulating means to start said transfer means adding said one substance to said second substance upon said driving means being incapacitated, said other detector being connected to said control means to stop said transfer means adding said second substance upon said weight responsive member reaching said second point.

11. An apparatus for adding an amount of one substance to a second substance wherein the amount to be added is a percentage of the weight of the second substance, said apparatus including a scale having a weight supporting member and a weight responsive rotatable member movable about an axis along a given path in a given direction in response to the addition of weight to said weight supporting member an amount which is a function of the weight placed upon said weight supporting member, supply means for said one substance including substance transfer means to add the one substance to the second substance and regulating means to control the amount of said one substance added by said transfer means to said second substance, a pair of detectors, mounting means for said detectors to permit said detectors to be moved along said path about said axis, power drive means including a motor connected to each of said detector mounting means through a gear train to move said detectors about said axis with the two detectors spaced from each other an amount representing said percentage of the weight corresponding to the point on the path occupied, at any given instant, by one of said detectors, control means connected to said one of said detectors and to said drive means to stop said detectors upon said one of said detectors reaching the point on the path corresponding to the weight of the substance placed on the scale whereby the other detector is stopped at a second point on said path corresponding to said weight of said substance plus said percentage, a rotatably mounted printing wheel having weight-indicating indicia thereon, said wheel being connected to said drive means for rotation thereby, a platen and electrically actuated mounting means for said platen to bring the platen in contact with a portion of the wheel to record the indicia appearing at said portion, said control means being also connected to said regulating means and to said electrically actuated mounting means to start said transfer means adding said one substance to said second substance and to bring said platen in contact with said wheel upon said detectors being stopped, said other detector being connected to said control means to stop said transfer means adding said second substance upon said rotatable member reaching said second point.

12. An apparatus for use with a scale of the type having a weight responsive member moveable along a given path in response to a change in weight upon the weight supporting member thereof an amount which is a function of the weight imposed upon the weight supporting member, said apparatus including a detector, mounting means for said detector to permit said detector to be moved along said path about said axis free of said weight responsive member, power drive means including a motor connected to said mounting means to move said detector about said axis, control means connected to one of said detectors and to said drive means to stop said detector upon said detector reaching the point on the path occupied by said responsive member, a rotatably mounted printing wheel having indicia thereon corresponding to the weights supportable by said scale, said wheel being connected to said drive means for rotation thereby, a platen, and electrically actuated mounting means for said platen to bring the platen in contact with a portion of the wheel to record the indicia appearing at said portion, said control means being connected to said electrically actuated mounting means to bring said platen in contact with said wheel upon said detector being stopped.

BERNARD T. HENSGEN.
HOWARD G. REICHEL.

References Cited in the file of this patent
UNITED STATES PATENTS

| Number | Name | Date |
|---|---|---|
| 2,088,257 | Beisser | July 27, 1937 |
| 2,346,953 | Walter | Apr. 18, 1944 |
| 2,389,113 | Reichel | Nov. 13, 1945 |
| 2,605,694 | Moss et al. | Aug. 5, 1952 |
| 2,605,695 | Campbell | Aug. 5, 1952 |